C. W. H. BLOOD.
AUTOMATIC FEEDING TABLE.
APPLICATION FILED DEC. 14, 1911.
1,041,234.
Patented Oct. 15, 1912.
4 SHEETS—SHEET 1.
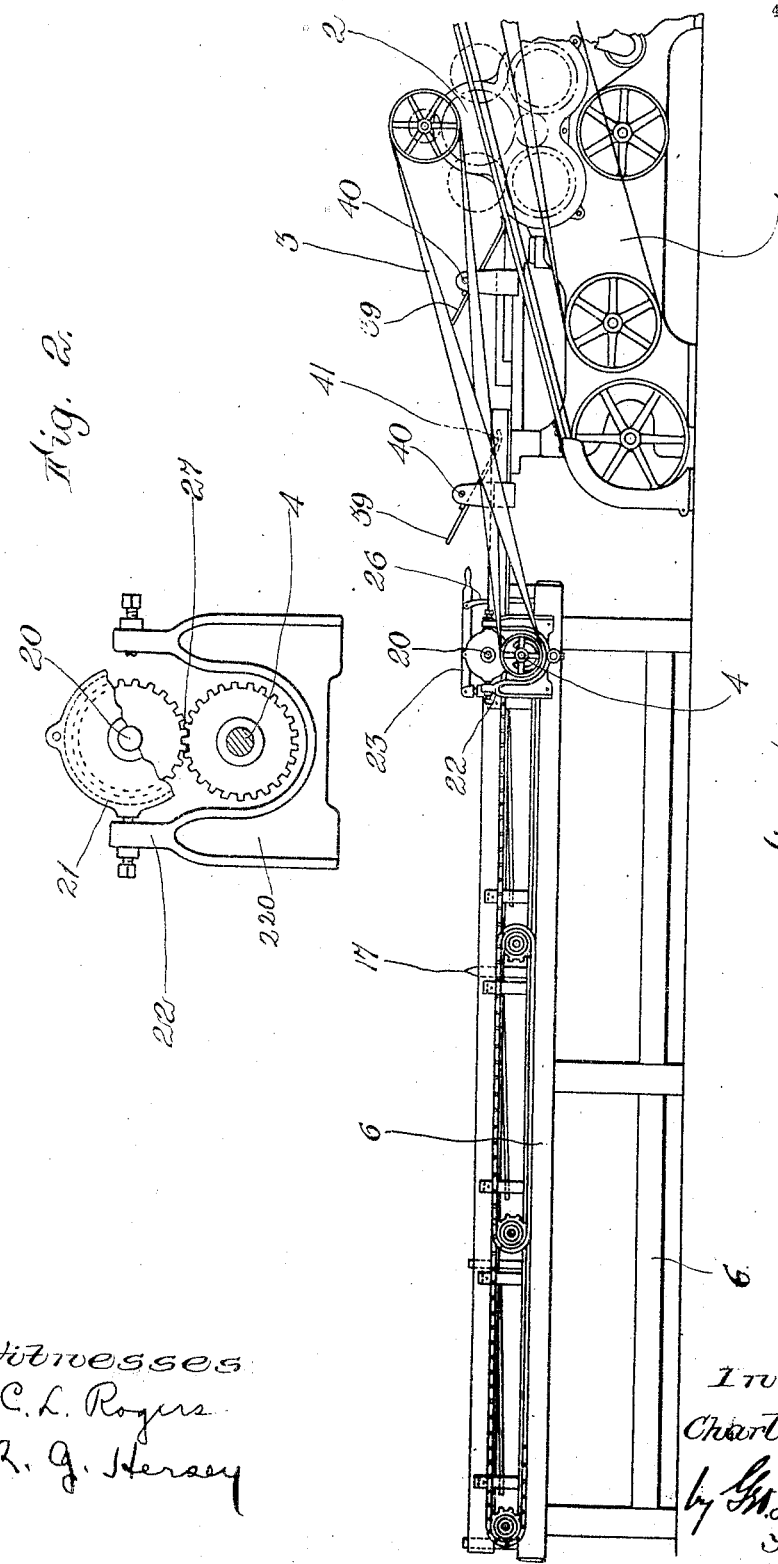

C. W. H. BLOOD.
AUTOMATIC FEEDING TABLE.
APPLICATION FILED DEC. 14, 1911.
1,041,234.
Patented Oct. 15, 1912.
4 SHEETS—SHEET 2.
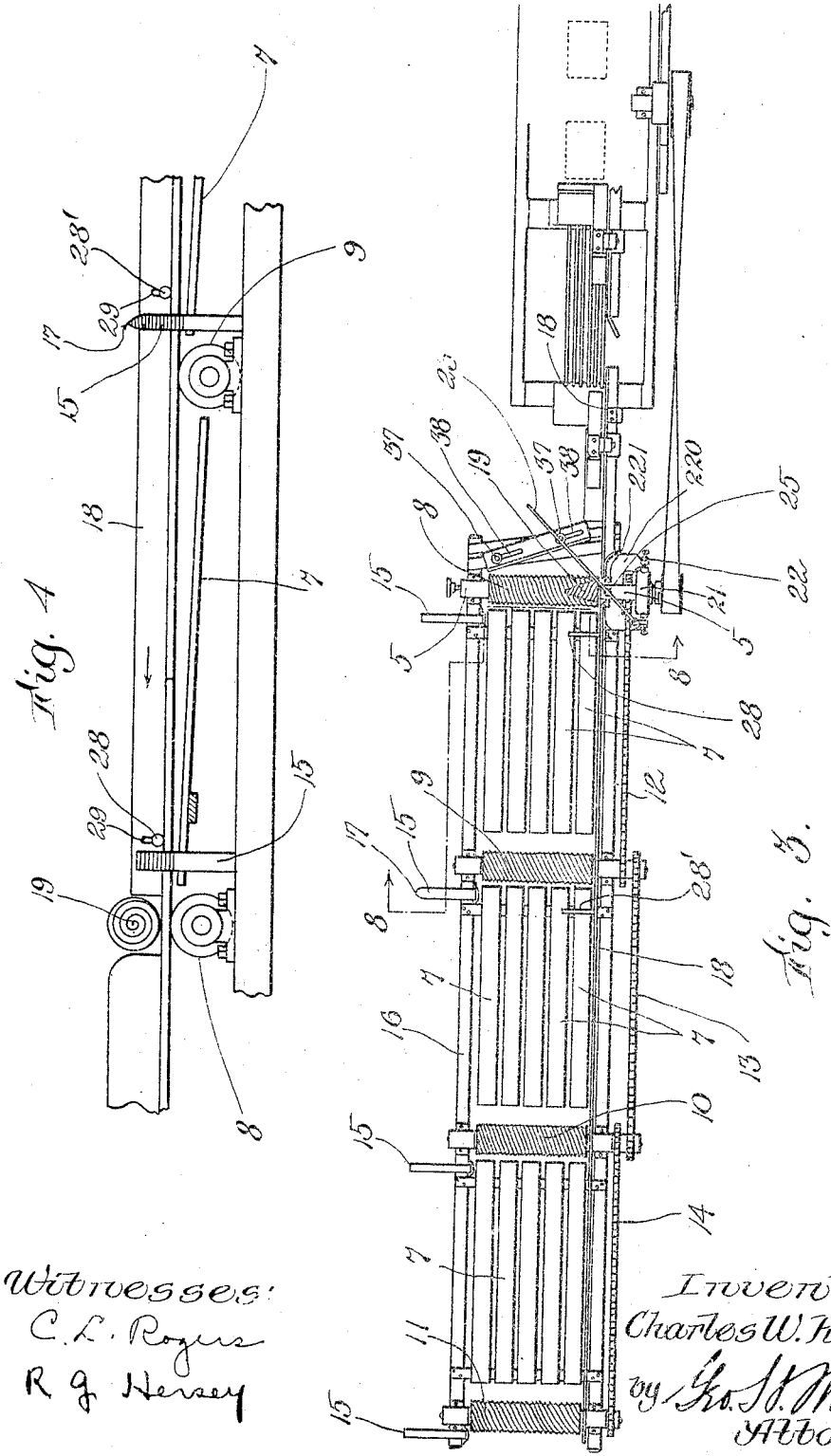
Witnesses:
C. L. Rogers
R. G. Hersey
Inventor:
Charles W. H. Blood,
by Geo. H. Maxwell,
Attorney.

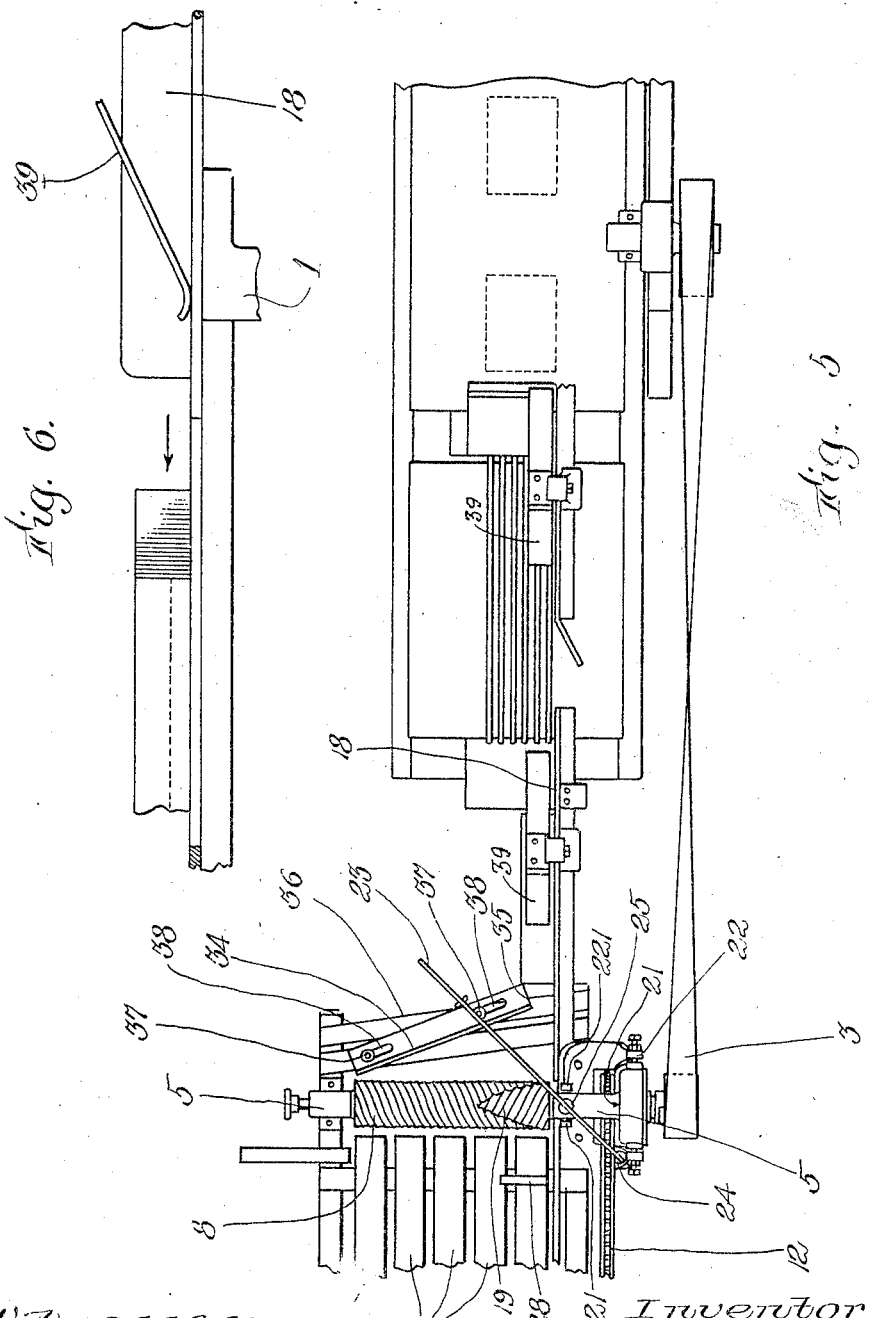

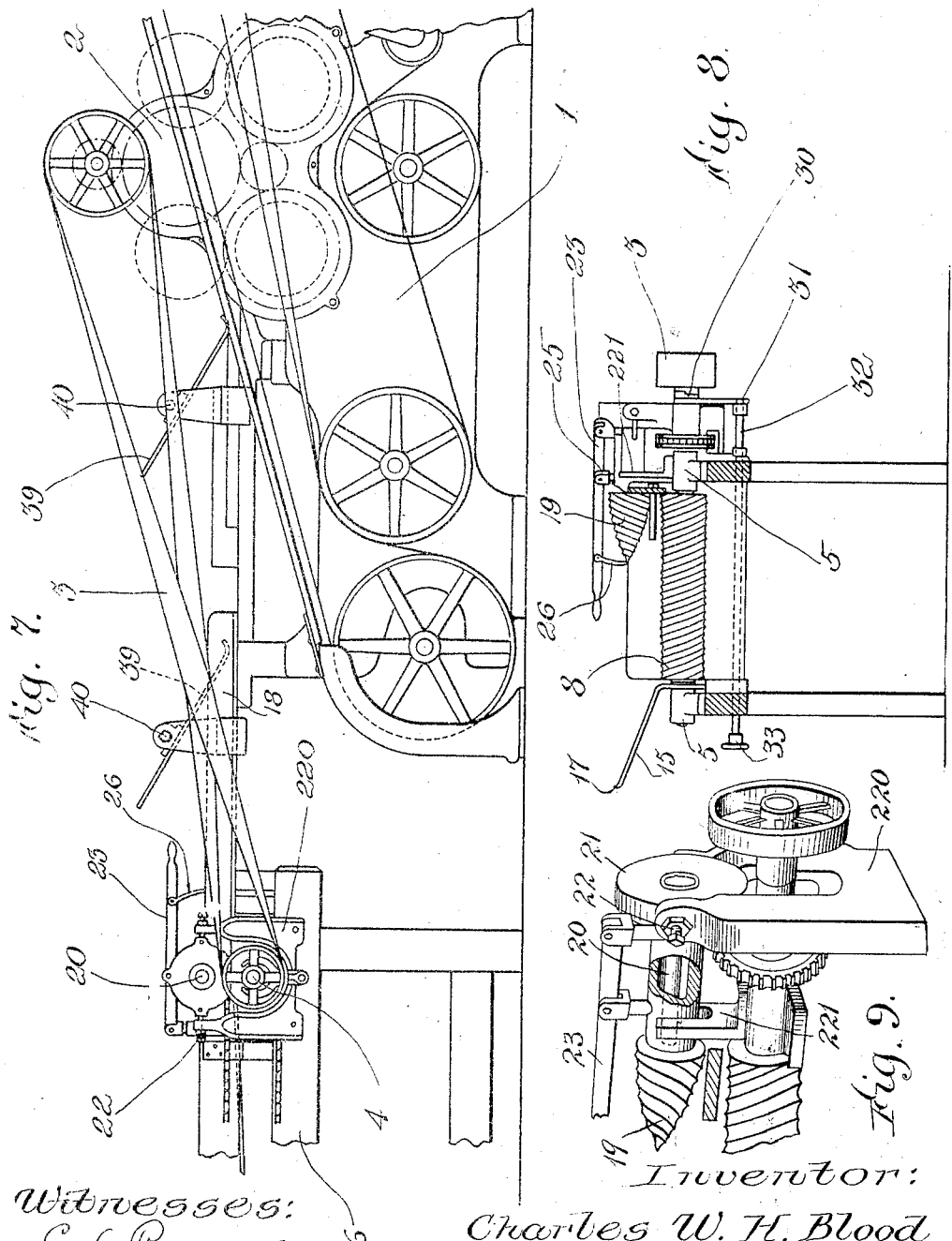

UNITED STATES PATENT OFFICE.

CHARLES W. H. BLOOD, OF WINTHROP, MASSACHUSETTS, ASSIGNOR TO S. A. WOODS MACHINE COMPANY, OF BOSTON, MASSACHUSETTS.

AUTOMATIC FEEDING-TABLE.

1,041,234.  Specification of Letters Patent.  Patented Oct. 15, 1912.

Application filed December 14, 1911. Serial No. 665,593.

*To all whom it may concern:*

Be it known that I, CHARLES W. H. BLOOD, a citizen of the United States, and resident of Winthrop, county of Suffolk, State of Massachusetts, have invented an Improvement in Automatic Feeding-Tables, of which the following description, in connection with the accompanying drawings, is a specification, like letters on the drawings representing like parts.

This invention relates to feeding mechanism for advancing pieces of stock in a continuous line to a machine for operating thereon and, while having other and more general fields of usefulness, is especially designed to coöperate with a planer or like machine to automatically feed a continuous line of boards or other stock to the machine.

A principal object of the invention is to provide a mechanism adapted to receive boards or other stock supplied thereto irregularly, for example, in intermittent bunches or carelessly, and to automatically take the boards one by one and feed them in proper alinement to the planing mechanism with the forward end of each board always abutting against the rear end of the preceding one so that an uninterrupted line to the planer heads is maintained. The invention provides means to insure that only one board shall be advanced to the planer mechanism at once and adjustments are provided to accommodate boards or other stock of varying widths and thicknesses.

In carrying out my invention I connect the automatic feeding mechanism for operation in timed relation to the planer and I preferably connect the driving connections so that the feed mechanism of the feeding table over-runs the drive or receiving capacity of the planer, say about twenty per cent., so that the succession of boards being fed are always closely pressed and abutted end to end as is requisite in the high speed planer operations now in common use.

The above and other features of invention will be better understood from the following detailed description taken in connection with the accompanying drawings, and will be thereafter pointed out in the appended claims.

Referring to the drawings, Figure 1 is a side elevation of my improved apparatus with a portion of the planer mechanism. Fig. 2 is an enlarged view, partly in elevation and partly in section, showing the mounting and drive connections of the feeding rolls. Fig. 3 is a plan view of the apparatus. Fig. 4 is a partial side view from the side opposite that of Fig. 1 showing details of the feeding mechanism. Fig. 5 is a partial plan view of the principal operating parts. Fig. 6 is an elevation of the right hand portion of Fig. 5 enlarged and showing the manner of board feed. Fig. 7 is a partial side elevation corresponding to Fig. 5. Fig. 8 is a transverse section on line 8—8 of Fig. 3, and Fig. 9 is a detail perspective view showing the manner of mounting one of the rolls.

The work receiving portion of the planer mechanism is indicated generally at 1 and as the special construction thereof forms no part of the present invention it is thought unnecessary to describe the same particularly herein. The work receiving rolls 2 of the planer are connected as by means of belt connections 3 to a prime drive shaft 4 of the feeding table so that this and the other parts of the feeding mechanism are operated in definite timed relation to the movement of the planer. The shaft 4 is mounted in suitable bearings 5 in a framework 6 which supports the feeding table 7 and the various elements of the feed mechanism. The shaft 4 has fixed thereto a roll 8 having spiral ribs V-shaped in cross-section formed on its periphery, the apexes of these ribs being more or less sharp to engage the work for lateral feeding as later described. Other similar rolls 9, 10, 11 with similar ribs are mounted at intervals along the length of the table, these being connected to be driven from the shaft 4 of roll 8 by means of sprocket connections 12, 13, 14 from each roll shaft to the succeeding one. The several rolls 8, 9, 10, and 11 have their tops slightly above the surface of table 7 as is usual for feeding rolls, and so long as the boards are free to advance endwise they are moved straight forward by these rolls.

The table is provided at its work receiving side with a series of brackets or arms 15 extending diagonally upward from a supporting rail 16 approximately at or just above the level of the tops of the feed rolls. These arms form a sort of chute down which the boards deposited at random are adapted to slide on to the rolls. I preferably form at least one of these arms, as shown the intermediate one, with an upwardly projecting beak 17 adapted to have boards rested thereon and swung or otherwise manipulated for lowering on to the feed table. At the other side of the table from the arms 15 a guide wall 18 extends the length of the table, this being on the side toward which the spiral ribs on the rolls tend to move the boards should they encounter an obstacle to their endwise movement. The forward spiral feed roll 8 has coöperative therewith a conically formed or "pineapple" roll 19 likewise formed on its circumference with spiral feeding ribs. This roll is mounted on a shaft 20 having bearing in a sleeve casing support 21 journaled near its rear end on horizontal pivot bearings 22 upstanding from a lower yoke casting 220 which may also furnish bearing for the shaft 4, so that the roll 19 is capable of a swinging up and down movement. Vertical guides 221 extending upward from a bearing support mounted on the machine frame engage the sides of a forwardly projecting sleeve portion of support 21 adjacent the roll to keep it in vertical alinement. To effect this movement manually a lever 23 pivoted at 24 has connection with the bracket 21 by means of a link 25. The lever 23 has a rod or bar 26 pivoted thereto adapted to swing down and rest on the framework to hold the pineapple roll 19 elevated out of engagement with the work when desired. The roll 19 is in geared connection with the shaft 4 of roll 8 as seen at 27, so as to be driven in time therewith and has a range of movement up and down so that boards or other stock of considerable variations in thickness may be gripped between these rolls and so that the roll 19 can be raised out of operative position when desired. The gear connection 27 is, as shown, in the plane of the pivot axis 22 of the roll 19 so that the vertical adjustment of this roll does not materially disturb this gear connection.

To insure that only one board of the particular thickness being operated on shall pass between the rolls 8 and 19 at once, I provide a guard stop 28 extending transversely inward from the wall 18 a short distance back of these rolls, this guard stop being vertically adjustable by a slot and clamp bolt connection, as seen at 29 for different thicknesses of stock. The normal position of this guard stop is shown in Fig. 8 wherein it is spaced above the plane of the lower rollers enough to permit a single board to pass under it, but at a height to stop another board or boards that might be lying on top of the one on the rolls. In this view the pineapple roll 19 is shown raised to inoperative position, it being understood that this moves or is moved down to engage the top of the board which has passed beneath the guard 28 to coöperate with roll 8 in feed ing the same onward from the work table. One or more auxiliary guard stops 28' similar to the stop 28 may be provided farther back on the table to assist in the even feeding of the boards to the rolls 8, 19 and to prevent an excessive piling up of the boards just back of these rolls.

A suitable clutch mechanism of any usual or desired form and shown as a shouldered slide collar 30 splined to shaft 4 is adapted to connect and disconnect the belt drive connection 3 for rendering the feeding table operative or inoperative, as required. This clutch is connected for operation from the opposite side of the table,—at which the boards are fed by a fork bar 31 engaging the clutch sleeve, fixed to a slide rod 32 passing transversely through the table, and having an operating knob or handle 33 at its other end.

At the forward end of the feeding table, just beyond the roll 8, a fence or barrier 34 extends transversely of the table in a diagonal direction with its end at the feed supply side of the table nearest the roll 8 and extending across the table so as to leave between its other end 35 and an extension of guide wall 18 a space sufficient to permit the passage of a single board, but no more. This barrier is mounted on a transverse support 36 by means of clamp bolts 37 passing through elongated slots 38 formed to permit the barrier to be adjusted lengthwise for different widths of boards. The barrier 34 serves as a stop for the boards as they are advanced lengthwise resting on different parts of the roll 8 and as the lengthwise movement of these is arrested, the spirally curved periphery of this roll and of any of the rearward rolls over which the boards may extend, causes the boards to be quickly moved transversely of the table until they are alined against the wall 18 and caught between the pineapple roll 19 and the roll 8.
The diagonal direction of the barrier 34 coöperates with the spiral grooves on the rolls to insure the speedy transfer of the boards laterally of the table as they strike against it. Thus the guard stops 28, in connection with the rolls 8 and 19, insure the feeding of the boards singly without one being on top of another flatwise, while the restricted passage between the end 35 of barrier 34 and the wall 18 prevents the boards from being delivered side by side edgewise. The driving connection 3 operates the table feeding mechanism described at a speed somewhat in excess of the receiving capacity of the planer, in practice about twenty per cent. faster, any interval there may be between the rear end of a preceding board and the front end of the next as delivered from the rolls being thus closed up, and each successive board having its forward end pressed against the rear end of the following one so that a continuous feed line of boards to the planer is made certain.

It is important, in view of the continuous forward pressing of one board endwise against another as delivered by the feeding table, that the boards be kept down on their guide ways to the planer, so as to insure the abutting of the ends against each other and prevent the riding of the forward end of one board over the next one ahead, and for this purpose I provide hold down members consisting, as shown, in presser bars or plates 39, two of these being shown mounted at intervals along the way from the feeding table to the planer. These bars are mounted on posts 40 and their rounded lower ends press downward firmly, but with a sufficiently yielding pressure upon the tops of the boards as they are fed along to the planer. Thus, the feeding alinement of the boards is preserved and warped or crooked stock prevented from buckling up to cause trouble, on entering the planer.

In use, the boards or other stock can be deposited at random and as irregularly as may be on the receiving arms 15 or the table 7, where they are taken up by the rolls 8, 9, 10 and 11 and advanced to the forward end of the feeding table, when, on coming against the fence or barrier 34, they are moved by the action of the spiral ribs laterally toward the side wall 18. Since the boards merely rest on the spiral ribs of the feed rolls 8, 9, 10 and have not a very intimate contact with them, their transverse movement as affected by the spiral ribs is comparatively slow, so that they do not get over far enough to pass through the opening between the end of the fence 34 and the side wall 18 until the preceding board has gotten too far away to be overtaken unless its transverse movement is accelerated to bring it rapidly over against the side wall and into alinement with the outlet opening. This acceleration of the transverse movement of the boards is partly the function of the pineapple roll, as the instant this roll engages the board from above, it adds sufficient pressure to it, together with its own spiral effect, to bring the board quickly opposite the opening allowing it to proceed on its way and catch up with the next board ahead. As before stated, the feed table mechanism is connected to be driven at an accelerated rate as compared with the receiving capacity of the planing machine, and hence, even though there may be some little delay owing to the transverse movement of a board described, before it gets past the end of the barrier, the accelerated movement imparted to it as soon as it is gripped between the pineapple roll and the lower roll 8 causes it to be quickly advanced so as to butt against the next board ahead. The handle 23 for moving the roll 19 up and down extends to a convenient position where it can be grasped by the operative for jigging it up and down to the extent required for speeding up a board to close up the gap between it and the one ahead and maintain a continuous feed, this manipulation of the pineapple roll also facilitating the separation of the board being fed from the pile behind. The roll 19 normally rests down on top of the board with some little pressure by gravity, so that it is in position to perform its speeding up function to a considerable extent without attention from the operator. When it is desired to render this roll inoperative the pivoted rod 26 on lever 23 is dropped down, as shown, so that the lever supports the roll up out of operative position. My invention is thus adapted to automatically feed a line of boards continuously and with certainty at the high speed required in present day practice, positioning and alining these boards from a supply to which no special attention need be given, only so that the supply is sufficient for the planer feed.

I am aware that various modifications in features of construction of the various parts of the mechanism constituting my invention can be made without departing from the spirit thereof, in its broader aspects, and I therefore desire that the embodiment herein described be considered as illustrative and not restrictive, as I believe the invention to be new for the purposes set forth, and I desire to cover the same broadly without limitations, except as set forth in the appended claims.

Having described my invention, what I claim as new and desire to secure by Letters Patent is:

1. An apparatus of the kind described, comprising means for receiving a plurality of boards at once and feeding them lengthwise, and means mounted and arranged for coöperation therewith for selecting the boards one by one as they are delivered thereto by said first named means and continuing their feed lengthwise in a continuous line.

2. An apparatus of the kind described, comprising mechanism for receiving a plurality of boards in miscellaneous arrangement at once, and delivering the same in a single continuous line with a tendency to move at a relatively high velocity, and means for operating on the boards, said means being arranged and connected to be driven so as to receive the boards of said line at a relatively retarded rate whereby they are held pressed end to end.

3. An apparatus of the kind described, comprising feeding means adapted for receiving a plurality of boards at once and advancing the same lengthwise, means mounted and arranged for coöperation therewith for selecting the boards one by one and continuing their feed lengthwise in a continuous line with a tendency to move at a relatively high velocity, and mechanism for operating on the boards connected to be driven so as to receive said continuous line at a relatively retarded rate whereby the boards are held pressed end to end.

4. An apparatus of the kind described, comprising a feed table adapted to receive a plurality of boards at once and having provision to feed the same lengthwise, means at the delivery end of the table arranged for coöperation with said feed table for alining the boards lengthwise, and means for selecting the boards one by one and continuing their advance lengthwise in a single continuous line.

5. An apparatus of the kind described, comprising a feed table adapted to receive a plurality of boards at once and having provision to move the same laterally, alining means adjacent the side of the table toward which the boards are moved, and means adjacent said alining means and near the forward end of the table for selecting the boards one by one and advancing them lengthwise in endwise alinement.

6. An apparatus of the kind described, comprising a feed table adapted to receive a plurality of boards at once and having provision for moving the same laterally, alining means adjacent the side of the table toward which the boards are moved, means near the forward end of the table for gripping the boards one by one and advancing them lengthwise in endwise alinement, and a barrier coöperative therewith for preventing the endwise movement of more than one board at a time from the table.

7. An apparatus of the kind described, comprising a feed table adapted to receive a plurality of boards in miscellaneous arrangement at once and having provision for advancing the same lengthwise, means coöperative therewith for alining the boards in the direction of lengthwise feed, and coöperative rolls adapted to engage the boards one by one and deliver them from said feed table in a continuous line.

8. An apparatus of the kind described, comprising a feeding table adapted to receive a plurality of boards at once in miscellaneous arrangement and having provision for advancing the same lengthwise, an inclined barrier mounted at the forward end thereof and coöperative with the feeding means for alining the boards lengthwise, and means for selecting the boards as thus alined one by one and continuing their advance lengthwise in a single continuous line.

9. An apparatus of the kind described, comprising a feeding table, means mounted thereon for moving boards laterally, an alining wall at the side of said table toward which the boards are moved, and a tapered roll adjacent said alining wall adapted to press on the boards and coöperative for selecting the boards one by one and advancing them in endwise alinement as determined by said alining wall, from said table.

10. An apparatus of the kind described, comprising a feeding table adapted to receive a plurality of boards in miscellaneous arrangement, means mounted thereon for moving the boards laterally of the table, alining means adjacent the side of the table toward which the boards are moved, and a tapered roll mounted adjacent said alining means and arranged to press upon the boards from above and coöperate in advancing them from the feed table in endwise alinement as determined by said alining means.

11. An apparatus of the kind described, comprising a feeding table, rolls mounted thereon having spirally ribbed peripheries, an alining wall at one side of said table, and means adjacent said wall for selecting the boards one by one and advancing them in a continuous line while held in alinement against said wall.

12. An apparatus of the kind described, comprising a feeding table, rolls mounted thereon with spirally ribbed peripheries, an alining wall at one side of said table, and an inclined barrier at the forward end of said table coöperative with said rolls for alining the boards lengthwise.

13. An apparatus of the kind described, comprising a feeding table, rolls mounted thereon with spirally ribbed peripheries, an alining wall at one side of said table, an inclined barrier at the forward end of said table coöperative with said rolls for alining the boards lengthwise, there being a passage between the end of said barrier and said wall for a single board line, and means for advancing the boards from said feeding table in a continuous line through said passage.

14. An apparatus of the kind described, comprising a feeding table having a plurality of spirally ribbed rolls mounted thereon, an alining wall at one side of said table, and upwardly inclined arms at the other side of said table forming a chute-way down thereonto.

15. An apparatus of the kind described, comprising a feeding table having a plurality of spirally ribbed rolls mounted thereon, an alining wall at one side of said table, and upwardly inclined arms at the other side of said table forming a chute-way down thereonto, one of said arms having an upstanding beak adapted to have the boards balanced thereupon to facilitate their positioning on the table.

16. An apparatus of the kind described, comprising mechanism for receiving a plurality of boards at once in miscellaneous arrangement, and delivering the same in a single continuous line, said mechanism including an alining wall at one side thereof, means for simultaneously pressing the boards against said wall and feeding the same lengthwise, and a guard stop preventing more than one board at a time being engaged by said last named means.

17. An apparatus of the kind described, comprising a feeding table having spirally ribbed feeding rolls, a barrier at the forward end of said table coöperative with said rolls for shifting the boards laterally, and a tapering ribbed roll coöperative with one of said feeding rolls for receiving the laterally moving boards and continuing their endwise movement.

18. An apparatus of the kind described, comprising a feeding table having spirally ribbed feeding rolls, a barrier at the forward end of said table coöperative with said rolls for shifting the boards laterally, a tapering ribbed roll coöperative with one of said feeding rolls for receiving the laterally moving boards and continuing their endwise movement, and a guard stop preventing more than one board at a time being engaged between said tapering roll and said feeding roll.

19. An apparatus of the kind described, comprising a feeding table provided with spirally ribbed feeding rolls, an alining wall at one side of said feeding table, an inclined barrier at the forward end thereof, a tapering ribbed roll coöperative with the forward one of said feeding rolls mounted adjacent said alining wall, and a guard stop for preventing more than one board at a time being engaged between said tapering roll and said feeding roll, there being a passage between the end of said barrier and said alining wall permitting the passage of a single board line only.

20. An apparatus of the kind described, comprising a feeding table having a spirally ribbed cylindrical feeding roll at its forward end, a vertically adjustable tapering ribbed roll mounted thereover at one side thereof, a guard stop preventing more than one board at a time engaging between said rolls, and means for moving the boards endwise and shifting the same laterally to bring them into engagement with said rolls.

21. An apparatus of the kind described, comprising a feeding table provided with spirally ribbed rolls, an alining wall at one side of said table, a barrier at the forward end of said table adjustably mounted to provide a variable passageway between the end thereof and said alining wall, a tapered ribbed roll at the forward end of said table adjacent said alining wall and coöperative with the forward feeding roll, and a vertically adjustable guard stop preventing the entrance of more than one board at a time between said rolls.

22. An apparatus of the kind described, comprising a feeding table having a spirally ribbed cylindrical feeding roll at its forward end, an inclined barrier adjacent thereto, a tapering roll mounted over said cylindrical roll for vertical movement, said rolls being coöperative for engaging the forward ends of the boards and advancing them one by one from the feeding table, and an alining wall coöperative with said rolls for delivering the boards in a continuous line.

23. An apparatus of the kind described, comprising mechanism for receiving boards in miscellaneous arrangement, and delivering the same in a single continuous line, said mechanism having provision for pushing the board line along so that the forward end of each board is pressed against the rear of the preceding one and hold down devices arranged to press upon said line to prevent the board ends from lapping over one another under the influence of such pressure.

24. An apparatus of the kind described, comprising mechanism for receiving boards in miscellaneous arrangement and delivering the same in a continuous line with a tendency to a relatively accelerated rate of movement, operating mechanism connected to be driven in timed relation thereto for receiving the board line at a relatively retarded rate whereby the boards are held pressed end to end, and hold down devices arranged to press on the board line to prevent the board ends from overlapping.

25. An apparatus of the kind described, comprising mechanism for advancing boards longitudinally and delivering them in a single continuous line, and means mounted and arranged for coöperation with said mechanism for moving the boards transversely at an intermediate stage in their longitudinal movement to bring them into lengthwise alinement.

In testimony whereof, I have signed my name to this specification, in the presence of two subscribing witnesses.

CHAS. W. H. BLOOD.

Witnesses:
 CARL G. OSTEMAN,
 E. W. ALLEN.